United States Patent Office 3,520,210
Patented July 14, 1970

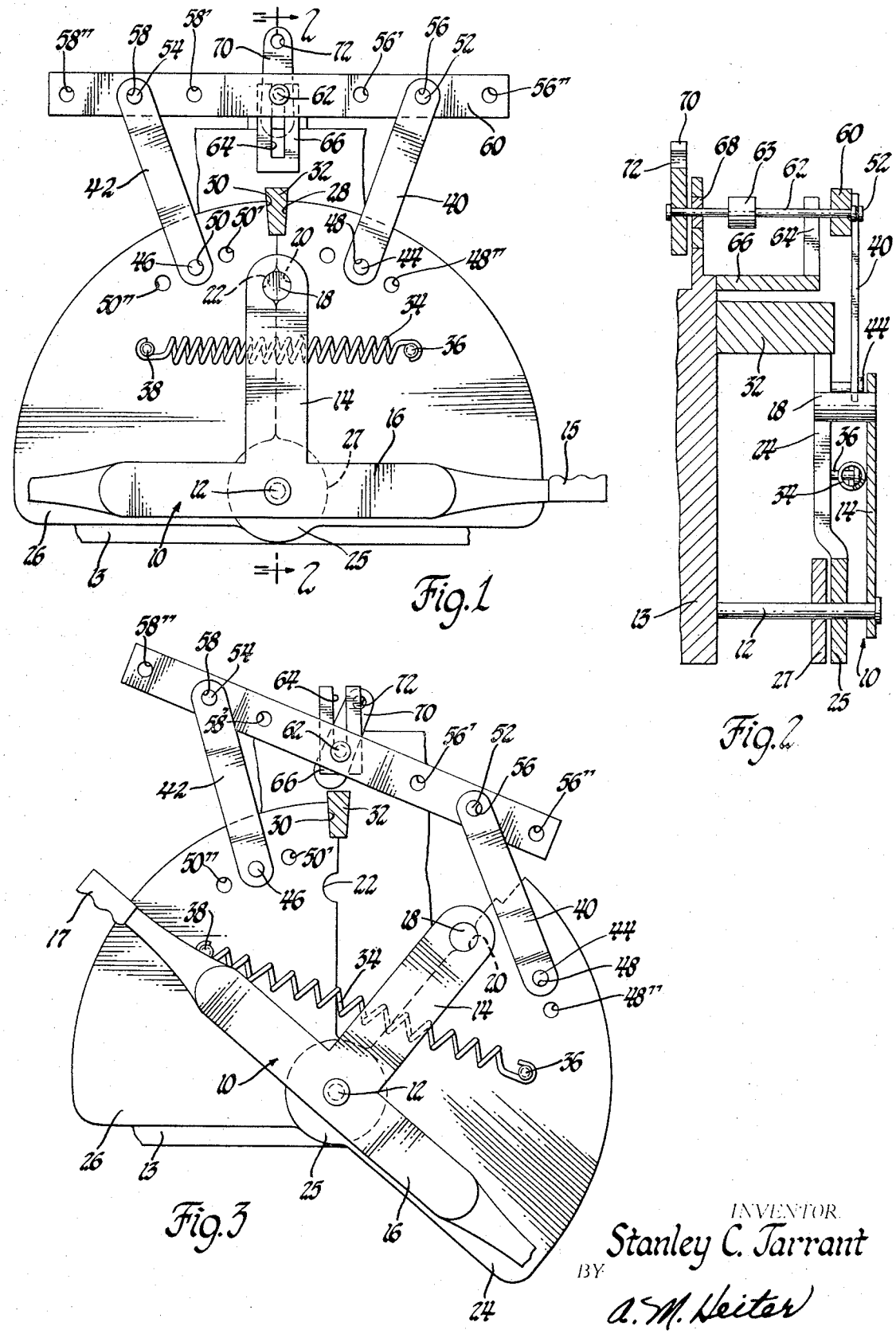

3,520,210
VARIABLE RATIO STEER LINKAGE
Stanley C. Tarrant, Brighton, Mich., assignor to General Motors Corporation, Detroit, Mich., a corporation of Delaware
Filed Nov. 1, 1968, Ser. No. 772,574
Int. Cl. B62d 1/12
U.S. Cl. 74—496                              6 Claims

ABSTRACT OF THE DISCLOSURE

A variable ratio steer mechanism having an operator control member operable to rotate a pair of input levers individually from a center position. The rotary motion of the input levers is transmitted via a pair of tie links to an output shaft which has a combined linear and rotary motion. The rotary motion of the output member, which varies in response to a predetermined amount of input lever rotation, as the input lever is moved from a center position is transmitted from the output member of the steer mechanism to a steerable member. The output shaft is guided in a slot at the upper end for linear motion and in a self-aligning bearing at the lower end so that the rotary motion is transmitted from the steer mechanism.

---

This invention relates to operator steering mechanisms and more particularly to variable ratio steering mechanisms which provide a variable rate output for a constant rate input.

The pesent invention includes an operator control member and two input levers mounted for rotation on a common shaft. A pin on the operator control engages a slot on each of the input levers, thus providing a drive connection therebetween. A stop member locates the center position of the steer mechanism and a tension spring urges the input levers to the center position. A pair of tie links connect the input levers to an output controlled member comprised of a crossbar, an output shaft depending downwardly from the crossbar and an output lever fixed to the lower end of the output shaft. The output shaft is guided at its upper end in a slot and at its lower end in a self-aligning bushing.

The shaft may be connected to the displacement control of a steer by driving hydrostatic or hydromechanical dual output transmission such as those shown in the patents to Livezey et al. 3,373,636 and Christenson 3,383,953 or to a constant ratio steering gear commonly found in passenger vehicles. This variable ratio steer mechanism may also be substituted directly for the steering gear, in which event, the shaft of the output member would be coupled by appropriate linkage to the steerable wheels.

An object of the present invention is to provide an improved operator steer control mechanism which provides a high steer ratio when the mechanism is on center and a decreasing steer ratio as the steer lever is moved from center toward either the left or right extreme steer positions.

Another object of the present invention is to provide in an improved steer mechanism a pair of individually operated input levers and a single output member operatively connected to the input levers by tie links in which steer mechanism, the output member rotates at an initial low rate, with increasing rate for a constant rate of input rotation from the central position.

These and other objects and advantages of the present invention will become more apparent from the following description and drawings in which:

FIG. 1 is a plan view of the steer linkage in the central position;

FIG. 2 is an elevational view partly in section taken along line 2—2 in FIG. 1;

FIG. 3 is a plan view of the steer linkage in a right steer position.

Referring to the drawings, wherein like characters represent like or corresponding parts, there is shown a steering mechanism having an operator control 10 rotatably mounted on a shaft 12 which is secured to a vehicle frame member 13. The operator control 10 is T-shaped having a leg portion 14 and a cross portion 16 which provides a steering handle with hand grip portions 15 and 17. A pin 18 is secured to the leg portion 14. The pin 18 abuts half circle notches 20 and 22 in input levers 24 and 26 respectively when the steer mechanism is centered as in FIG. 1. The input levers 24 and 26 have semicircular portions 25 and 27 which are rotatably mounted in the shaft 12. The input levers 24 and 26 are circular segments having notches 28 and 30 at their outer periphery thereof. The notches 28 and 30 abut the center locating stop 32, which is also secured to the vehicle frame member 13, when either or both of the levers 24 and 26 are in the center position. A tension spring 34 is connected between pins 36 and 38 on the levers 24 and 26 respectively to bias the levers toward the center position and to provide a return force for the levers after a steer maneuver has been made.

A pair of tie links 40 and 42 are pivotally mounted, at one end, on pins 44 and 46 respectively. The pins 44 and 46 are mounted on the levers 24 and 26 in openings 48 and 50. The other end of tie links 40 and 42 are pivotally mounted on pins 52 and 54 which are located in openings 56 and 58 on an output crossbar 60. An output shaft 62 is secured to the crossbar 60 and depends downwardly therefrom through a slot 64 in a guide member 66 which is secured to the frame 13. The lower end of output shaft 62 is located in a self-aligning bushing 68 and has a steer lever 70 secured thereto. The self-aligning bushing 68 is also secured in the frame 13. The steer lever 70 has an opening 72 and is adapted for a variety of vehicle steering systems. This mechanism may be used in vehicle steering systems having steerable wheels or in steer by driving vehicles using hydrostatic units. In the former steer systems, the output lever 70 is connected into the conventional Ackerman type linkage and, in the latter, the output lever is connected to the steer control such as the displacement control for the hydrostatic units.

To accomplish a steer maneuver, the operator rotates the control 10, thereby causing rotation of lever 24 or 26, through the pin 18. As shown in FIG. 3, a right turn is provided when the control 10 is rotated clockwise. During a right turn, the lever 26 remains stationary against the stop 32 while the lever 24 is rotated. Due to the tie link 40, the right end of crossbar 60 is pulled toward the lever 24 and the output shaft 62 moves linearly in the slot 64. Since the lever 26 and pin 46 are stationary, the tie link 42 pivots on the pin 46 and the crossbar 60 pivots on pin 54. This pivotal movement and the guiding of shaft 62 causes the crossbar 60 and the shaft 62 to rotate clockwise. The amount of rotation of the output shaft 62 relative to the lever 24 increases as the lever 24 is moved further from the center position. Since the lower end of the output shaft 62 is fixed in the self-aligning bushing 68, the output lever 70 rotates with no linear movement. To prevent linear movement of lever 70, a constant velocity universal joint 63 is connected between the upper and lower portions of the output shaft 62. This permits relative angular movement between the upper and lower ends of the output shaft 62, while transmitting all of the rotation of the upper end to the lower end. If the operator releases the control 12, the spring 34 will return the lever 24 to the center position.

A plurality of openings 48', 48" and 50', 50" in levers 24 and 26 and openings 56', 56" and 58', 58" in crossbar 60 are provided to produce a decrease or increase in the initial rate of rotation of output shaft 62 for a given rate of rotation of the input levers 24 and 26. If the tie links 40 and 42 are located between openings 48', 56' and 50', 58', the initial rate of rotation of output shaft 62 and output lever 70 in response to rotation of input levers 24 and 26, will be less than the rate of rotation that occurs when the tie links are in the position shown. When the tie links 40 and 42 are connected between openings 48", 56" and 50", 58", the initial rate of rotation of output lever 70 will increase. Thus, the steering mechanism not only provides a variable ratio but is also adjustable to provide the variable ratio most suitable for any particular vehicle.

The above description and drawing are illustrative of the preferred embodiment and are not intended as limitations since many modifications will be apparent to those skilled in the art.

What is claimed is:

1. In a variable ratio steering mechanism movable operator steer means; a pair of input lever means operatively and individually connected to said operator steer means; center locating means for establishing the center position of said pair of input lever means and said operator steer means; linear and rotary movable output means including linear guide means for controlling the linear movement of said output means; and a pair of tie links operatively connecting each of said input lever means and said output means whereby rotary movement of said operator steer means is transmitted to said output means to provide rotary movement thereof which varies according to the amount the input lever means is moved from the center position.

2. In a variable ratio steering mechanism movable operator steer means, a pair of input lever means operatively and individually connected to said operator steer means; center locating means for establishing the center position of said pair of input lever means and said operator steer means; movable output means including a shaft member, and linear guide means for controlling linear movement of said shaft member; and a pair of tie links operatively connecting each of said input lever means and said output means whereby rotary movement of said operator steer means is transmitted to said output means to provide rotary movement thereof which varies according to the amount the input lever means is moved from the center position.

3. In a steer mechanism a rotatable control member; a movable controlled member; and means operatively connecting said control and controlled members for providing a variable movement of said controlled member in response to a constant movement of said control member including a pair of input levers individually selectively connectable with said control member, a pair of tie links each pivotally connected to one of said input levers and said controlled member, center locating means for establishing the central position of said input levers, said control member and said controlled member, and spring means operatively connected between said input levers to bias the input levers toward the central position.

4. In a variable ratio steering mechanism movable operator steer means rotatably mounted on a shaft, a pair of input lever means rotatably mounted on said shaft; means including a pin on said steer means and slots on said input lever means operatively and individually connecting said operator steer means and said input lever means; center locating means for establishing the center position of said pair of input lever means and said operator steer means including a rigid member, recesses on said input lever means aligned to abut said rigid member, and spring means operatively connected between said input lever means to urge said lever means into abutment with said rigid member; movable output means including a shaft member, linear guide means for controlling linear movement of one end of said shaft member and a self-aligning bushing for permitting only rotary movement of the other end of said shaft member; and a pair of tie links operatively connecting each of said input lever means and said output means whereby rotary movement of said operator steer means is transmitted to said output means to provide a rotary movement thereof which varies according to the amount the input lever means is moved from the center position.

5. In a variable ratio steering mechanism movable operator steer means, a pair of input lever means operatively and individually connected to said operator steer means; center locating means for establishing the center position of said pair of input lever means and said operator steer means and for permitting rotary motion of one of said input lever means only in one direction from center, and of the other input lever means in only the opposite direction from center; movable output means including a shaft member, and linear guide means for controlling linear movement of said shaft member; and a pair of tie links operatively connecting each of said input lever means and said output means whereby rotary movement of said operator steer means is transmitted to said output means to provide a rotary movement thereof which varies according to the amount the input lever means is moved from the center position.

6. In a steer mechanism a rotatable control member; a movable controlled member; and means operatively connecting said control and controlled members for providing a variable movement of said controlled member in response to a constant movement of said control member including a pair of input levers individually selectively connectable with said control member, a pair of tie links each pivotally connected to one of said input levers and said controlled member, center locating means for establishing the central position of said input lever, said control member and said controlled member including a rigid member, a slot on each of said input levers aligned to abut said rigid member, and spring means operatively connected between said input levers to bias the input levers into abutment with said rigid member thereby establishing the central position.

References Cited

UNITED STATES PATENTS

| 2,883,878 | 4/1959 | Landgreen | 74—496 |
| 3,250,494 | 5/1966 | Peterson | 74—471 X |

MILTON KAUFMAN, Primary Examiner

U.S. Cl. X.R.

74—516

PO-1050
(5/69)

UNITED STATES PATENT OFFICE
CERTIFICATE OF CORRECTION

Patent No. 3,520,210                     Dated July 14, 1970

Inventor(s)     Stanley C. Tarrant

It is certified that error appears in the above-identified patent and that said Letters Patent are hereby corrected as shown below:

Column 1, line 17, after output insert -- member comprised of a crossbar and an output -- ;

line 24, after that insert -- only -- ;

line 32, delete "pesent" and insert -- present --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents